United States Patent [19]

Horgas

[11] Patent Number: 4,950,100
[45] Date of Patent: Aug. 21, 1990

[54] MOVABLE SUPPORT ARM

[75] Inventor: Jon C. Horgas, Westland, Mich.

[73] Assignee: Tru-Bore Engineering, Westland, Mich.

[21] Appl. No.: 347,729

[22] Filed: May 5, 1989

[51] Int. Cl.$^5$ .......................... E04G 3/00; A47F 5/10
[52] U.S. Cl. .................................. 403/405.1; 403/113;
   403/119; 403/161; 403/DIG. 9; 248/280.1;
   248/281.1; 248/324
[58] Field of Search ................. 403/65, 113, 119, 161,
   403/405.1, DIG. 9, 117; 248/274, 324, 248,
   280.1, 281.1

[56] References Cited

U.S. PATENT DOCUMENTS

| | | | |
|---|---|---|---|
| 3,662,981 | 5/1972 | Hogrebe | 248/278 |
| 4,082,244 | 4/1978 | Groff | 248/280.1 |
| 4,093,171 | 6/1978 | Mengo, Sr. | 403/113 X |
| 4,447,031 | 5/1984 | Souder, Jr. et al. | 248/281.1 X |
| 4,453,695 | 6/1984 | Sennott et al. | 248/278 X |
| 4,767,232 | 8/1988 | Francis | 403/113 X |
| 4,846,434 | 7/1989 | Krogsrud | 248/281.1 X |

Primary Examiner—Andrew V. Kundrat
Assistant Examiner—Franco S. DeLiguori
Attorney, Agent, or Firm—Weintraub, DuRoss & Brady

[57] ABSTRACT

An articulated arm for supportably attaching a movable first body to a second body comprises a connector bar which fits inside a substantially hollow sheath, each of the connector bar and sheaths being pivotally attached to a first intermediate member at a first end thereof and to a second intermediate member at a second end thereof. Fasteners are provided to temporarily and disengagably fix the position of the connector bar with respect to the sheath. Hardware is described for attaching the first intermediate member to a movable first body and for attaching the second intermediate member to a second body which is substantially stationary with respect to the first body.

10 Claims, 1 Drawing Sheet

U.S. Patent
Aug. 21, 1990
4,950,100
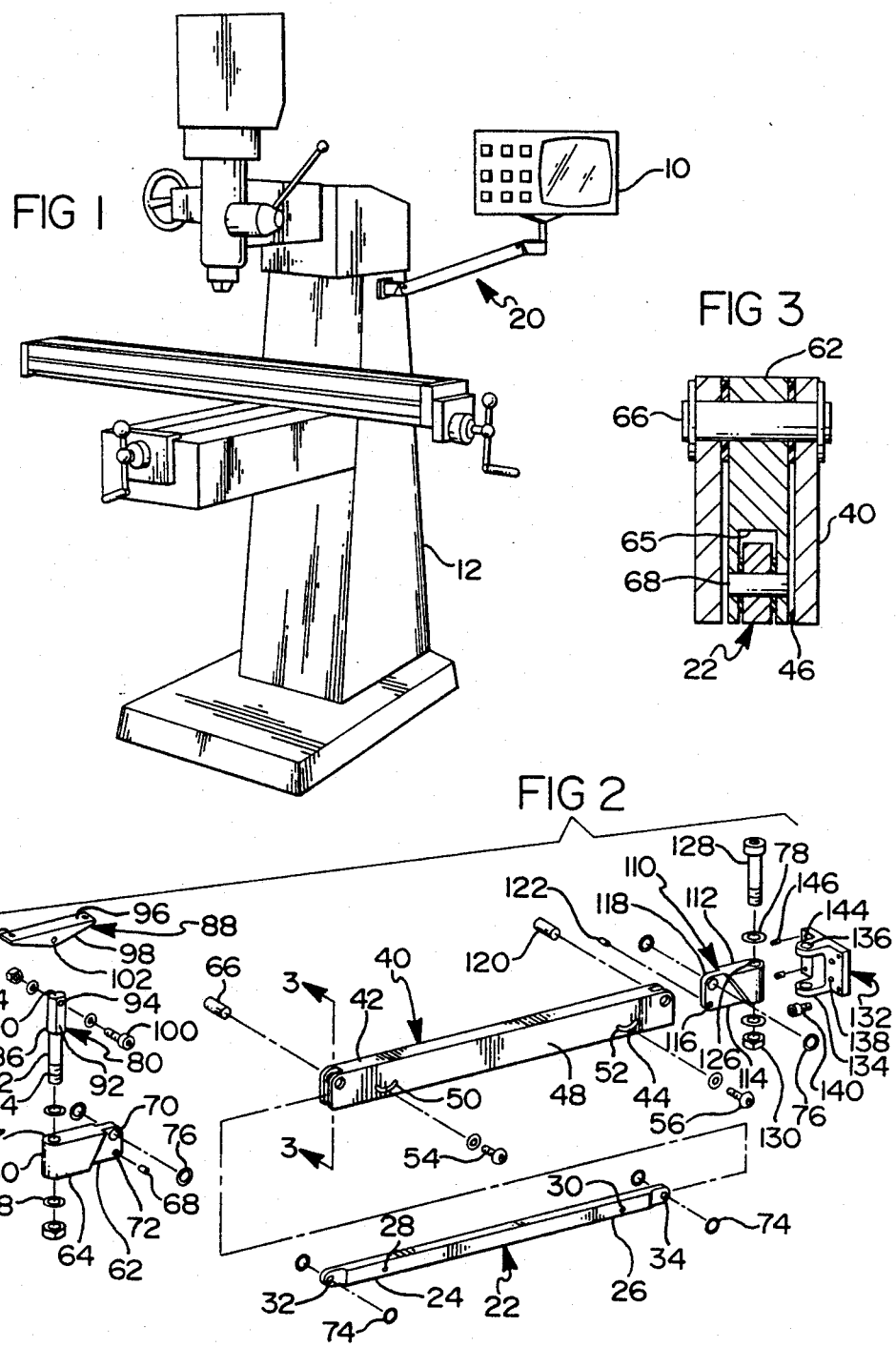

MOVABLE SUPPORT ARM

BACKGROUND OF THE INVENTION

1. Field of the Invention

The present invention relates to a support arm for movably connecting a movable first body to a second body which is substantially stationary with respect to the first body. More particularly, the present invention relates to such a support arm which includes a pivotable connector bar disposed in a substantially hollow sheath.

2. Description of the Prior Art

In industry today, many types of machines and equipment are becoming computerized and require operator input to guide the computer in performing various tasks. An input/output terminal is therefore often required for use with modern industrial machinery. However, since different shops or plants are set up in different fashion, it is not desirable to fixedly mount or attach an input-/output terminal to an industrial machine. A machine operator may also be located at different parts of a given machine to perform different jobs with the same machine at different times. It is more advantageous to mount an input/output terminal to a machine in such a fashion that the terminal may be moved up and down and pivoted to an optimal orientation towards a machine user. In addition, it is desirable to be able to temporarily lock the terminal into a fixed relationship with the machine once an optimal orientation had been obtained.

More broadly speaking, there often is a need to attach a movable first body to a second body which is substantially stationary with respect to the first body, and it is often desirable to lock the means of attachment into a fixed orientation once an optimal arrangement is set up.

Movable support arms, per se, are not new. Such arms have been use for many applications such as, e.g., lamps, drafting equipment, and the like. However, none of the prior art support arms have provided the novel features of the present invention as set out hereinbelow.

SUMMARY OF THE INVENTION

The present invention provides an articulated arm for supportably attaching a movable first body to a second body which is substantially stationary with respect to the first body. The support arm of the present invention is particularly suited for attaching an input/output terminal device to an industrial machine, although the present invention is not limited to such a usage.

An adjustable support arm in accordance with the present invention comprises:

(a) a connector bar having a first end and a second end, the bar being formed from a rigid material;

(b) a substantially hollow sheath defining a passage therein, the connector bar being disposed in the passage of the sheath, the sheath having a first end and a second end;

(c) a first intermediate member comprising:
 (i) a reduced diameter portion dimensioned to fit in the passage at the first end of the sheath,
 (ii) an enlarged diameter portion integral with the reduced diameter portion and dimensioned so as to be too large to fit within the passage of the sheath;

(d) means for attaching the first intermediate member to a movable first body;

(e) a second intermediate member comprising:
 (i) a reduced diameter portion dimensioned to fit in the passage of the sheath at the second end thereof,
 (ii) an enlarged diameter portion integral with the reduced diameter portion and dimensioned so as to be too large to fit within the passage of the sheath;

(f) first pivot means for pivotally attaching the first intermediate member to the first end of the sheath;

(g) second pivot means for pivotally attaching the first intermediate member to the first end of the connector bar;

(h) third pivot means for pivotally attaching the second intermediate member to the second end of the sheath;

(i) fourth pivot means for pivotally attaching the second intermediate member to the second end of the connector bar; and (j) means for attaching the second intermediate member to a second body which is substantially stationary with respect to the first body.

The arm of the present invention may comprise means for temporarily and disengagably fixing the position of the connector bar with respect to the sheath.

For a more complete understanding of the present invention, reference is made to the detailed description section which should be read in conjunction with the accompanying drawings. Throughout the following description and in the drawings, identical reference numbers are used to refer to the same part shown in multiple figures of the drawings, in which:

BRIEF DESCRIPTION OF THE DRAWINGS

FIG. 1 is a perspective view of the movable support arm of the present invention attaching a movable first body to a fixed machine;

FIG. 2 is an exploded perspective view of the support arm of the present invention; and FIG. 3 is a cross-sectional view taken along the line 3—3 of FIG. 2.

DETAILED DESCRIPTION OF THE PREFERRED EMBODIMENT

Referring to FIG. 1, a data input terminal 10 is shown as an example of a movable body. A heavy duty industrial machine 12 is illustrated as an example of a second body which is substantially stationary with respect to the first body. Connecting the movable first body 10 to the stationary second body 12 is the articulated movable support arm 20 of the present invention.

Referring now to FIGS. 2–3, a connector bar 22 is shown having a first end 24 and a second end 26. The connector bar is provided with threaded holes 28, 30 inwardly on the bar 22 spaced apart from the first and second ends 24, 26, respectively. Pivot holes 32, 34 are formed through the connector bar 22 at each of the first and second ends 24, 26 thereof. The connector bar 22 in the embodiment shown has a rectangular cross section, although this shape is not critical to the present invention. The connector bar 22 is preferably formed from a rigid material such as, e.g., steel or the like.

A substantially hollow sheath or beam 40 has a first end 42 and a second end 44, and defines a passage 46 in the hollow space formed therewithin. The connector bar 22 is disposed in the passage 46 and extends substantially throughout the length of the sheath 40. Formed in one side 48 of the sheath 40 are a pair of curved slots 50, 52 for allowing passage through the sheath 40 of a pair of threaded fasteners 54, 56 which threadably engage in the threaded holes 28, 30 in the connector bar 22 to temporarily and disengagably fix the position of the connector bar 22 with respect to the sheath 40 when the fasteners 54, 56 are tightened against the face 48 of the sheath 40.

A first intermediate member 60 has a reduced diameter portion 62 and an enlarged diameter portion 64 formed integrally with the reduced diameter portion 62. The reduced diameter portion 62 is dimensioned to fit in the passage 46 at the first end 42 of the sheath 40. A first pivot pin 66 serves as a first means for pivotally attaching the first intermediate member 60 to the first end 42 of the sheath 40. Formed within the reduced diameter portion 62 of the first intermediate member 60 is a hollowed out section 65, into which the first end 24 of the connector bar 22 is fitted. A second pivot pin 68 provides a second pivot means for pivotally attaching the first intermediate member 60 to the first end 24 of the connector bar 22. A pair of cylindrical through holes 70, 72 are provided in the reduced diameter portion 62 of the first intermediate member 60 to accommodate the first and second pivot pins 66, 68 respectively, and are generally vertically spaced from one another. Bushings 74 may be provided between the connector bar 22 and the hollowed out section 65 of the first intermediate member 60. Likewise, bushings 76 may be provided between the first intermediate member 60 and the sheath 40. The bushings 74, 76 may be made of bronze, a tough plastic such as nylon, or other appropriate material. A vertical through bore 77 is formed in the enlarged diameter portion 64 of the first intermediate member 60.

A substantially cylindrical support member 80 includes a shaft 82 having threads 84 formed at a lowermost end thereof, and the shaft 82 fits into and through the vertical bore 77 of the first intermediate member 60. Bushings 78 may be provided above and below the first intermediate member 60 and may be formed of bronze, copper, or plastic. The support member 80 includes a shoulder 86 to limit vertical movement of the support member 80 in the vertical bore 76 and prevent passage of the support member 80 therethrough. Opposing sides 90, 92 of the support member 80 are flattened and have a hollow bore 94 formed transversely therebetween through the support member 80.

A mounting bracket 88 comprises a substantially flattened platform 96 having two sides flanges similar to that shown at 98 extending downwardly from opposite sides of the platform 96. The mounting bracket 88 is pivotally attached to the support member 80 via the passage of a bolt or appropriate fastening member 100 through holes 102 in the side flanges 98 and through the transverse bore 94 of the support member 80. Vertical mounting holes 104 may be provided in the platform 96 of the mounting bracket 88 for use in attaching the platform 96 to a first body 10. The support member 80 and mounting bracket 88 provide a means for attaching the first intermediate member 60 to a movable first body, such as that shown at 10. Other suitable means for attaching the intermediate member 60 to a movable first body 10 may be used, as will be appreciated by one skilled in the art.

The present invention further comprises a second intermediate member 110 having a reduced diameter portion 114 dimensioned to fit in the passage 46 of the sheath at the second end 44 thereof, and an enlarged portion 112 integral with the reduced diameter portion and dimensioned so as to be too large to fit within the passage 46 of the sheath. The second intermediate member is substantially similar to the first intermediate member 60 as may be seen in FIG. 2. The second intermediate member 110, may have a shorter length than the first intermediate member 60, although this is not critical. The second intermediate member 110 has a pair of transverse bores 116, 118 formed transversely through the reduced diameter portion 114 which are substantially vertically displaced with respect to one another. The second intermediate member 110 also has a hollowed out section similar to that shown at 65 to receive therein the second end 26 of the connector bar 22. A third pivot pin 120 serves as a third pivot means for pivotally attaching the second intermediate member 110 to the second end 44 of the sheath 40, and bushings 76 may be interposed the reduced diameter portion of the second intermediate member and the inside wall of the sleeve 40.

In a similar fashion, a fourth pivot pin 122 in the embodiment shown serves as a fourth pivot means for pivotally attaching the second intermediate member to the second end of the connector bar 22, the fourth pivot pin 122 passing through the bore 116 in the second intermediate member and through the bore 34 in the connector bar 22. Bushings 74 may be provided to fit between the outside of the second end 26 of the connector bar 22 and the hollowed out portion of the second intermediate member 110.

A substantially cylindrical vertical bore 126 may be provided through the second intermediate member 110 to accommodate fastening means such as bolt 128 and nut 130 shown. Washers 78 may be provided at the outer surface of the second intermediate member 110 at the terminal ends of the vertical bore 126. In one embodiment hereof, the sheath 40 and the first and second intermediate members 60, 110 may be formed from aluminum.

A mounting block may be provided as a means for attaching the second intermediate member 110 to a second body such as the industrial machine 12 shown which is substantially stationary with respect to the first body 10. The mounting block 132 is pivotally attached to the second intermediate member 110 by means of the bolt 128 passing through a pair of horizontal flanges 134 which have aligned vertical bores 136 formed therethrough. The mounting block 132 has four mounting holes such as that shown at 138 formed therethrough to accept fasteners such as bolts 140 therein. The mounting holes 138 may be counter sunk. Spaced outwardly around the edge of the vertical block 132 are four threaded cylindrical holes such as that shown at 144 which accommodate tensioning members such as Allen screws 146 shown. These Allen screws 146 can be tightened against the second body 12 after the mounting block 132 is snugly tightened to the body 12 by fasteners such as bolts 140. By tightening the tensioning members 146 against the second body 12, tension is placed on the heads of mounting bolts 140, and this tension does not allow the mounting bolts 140 to loosen due to vibration of the machine 12.

As seen in FIG. 2, the enlarged diameter portions 64, 112 of the first and second intermediate members 60, 110 slant outwardly away from the sheath as one moves downwardly along an outside edge thereof. This allows the enlarged diameter portions 64, 112 of the first and second intermediate members 60, 110 respectively to operate as stops to limit pivotal movement of the sheath 40 with respect to the intermediate members 60, 110.

Although the present invention has been described herein with respect to specific embodiments thereof, it will be understood that the foregoing description is intended to be illustrative, and not restrictive. Many modifications of the present invention will occur to those skilled in the art. All such modifications which fall within the scope of the appended claims are intended to be within the scope and spirit of the present invention.

Having, thus, described the invention, what is claimed is:

1. An articulated arm for supportably attaching a movable first body to a second body which is substantially stationary with respect to the first body, the arm comprising:
   (a) a connector bar having a first end and a second end, the bar being formed from a rigid material;
   (b) a substantially hollow sheath defining a passage therein, the connector bar disposed in the passage of the sheath, the sheath having a first end and a second end;
   (c) a first intermediate member comprising:
      (1) a reduced diameter portion dimensioned to fit in the passage at the first end of the sheath, and
      (2) an enlarged diameter portion integral with the reduced diameter portion and dimensioned so as to be too large to fit within the passage of the sheath, the enlarged diameter portion slanting outwardly away from the vertical along an edge thereof to define a stop for limiting pivotal movement of the sheath with respect thereto;
   (d) means for attaching the first intemediate member to a movable first body;
   (e) a second intermediate member comprising;
      (1) a reduced diameter portion dimensioned to fit in the passage of the sheath at the second end thereof, and
      (2) an enlarged diameter portion integral with the reduced diameter portion and dimensioned so as to be too large to fit within the passage of the sheath, the enlarged diameter portion slanting outwardly away from the vertical along an edge thereof to define a stop for limiting pivotal movement of the sheath with respect thereto;
   (f) first pivot means for pivotally attaching the first intermediate member to the first end of the sheath;
   (g) second pivot means for pivotally attaching the first intermediate member to the first end of the connector bar;
   (h) third pivot means for pivotally attaching the second intermediate member to the second end of the sheath;
   (i) fourth pivot means for pivotally attaching the second intermediate member to the second end of the connector bar; and
   (j) means for attaching the second intermediate member to a second body which is substantially stationary with respect to the first body.

2. The arm of claim 1, further comprising means for temporarily and disengagably fixing the position of the connector bar with respect to the sheath, the fixing means comprising at least one arcuate slot formed in the sheath and a threaded fastener which passes through the arcuate slot and which is threadably engagable in the connector bar.

3. The arm of claim 1, wherein the sheath and the first and second intermediate members are formed from aluminum.

4. The arm of claim 1, further comprising a first bushing between the first intermediate member and the sheath, and a second bushing interposed between the second intermediate member and the sheath.

5. The arm of claim 4, further comprising a third bushing interposed between the first intermediate member and the connector bar, and a fourth bushing interposed between the second intermediate member and the connector bar.

6. The arm of claim 1, wherein the means for attaching the first intermediate member to the first body comprises:
   a support member attached to the first intermediate member and which extends upwardly therefrom.

7. The arm of claim 1, wherein the connector bar is directly connected to both the first and second intermediate members.

8. An articulated arm for supportably attaching a movable first body to a second body which is substantially stationary with respect to the first body, the arm comprising:
   (a) a connector bar having a first end and a second end, the bar being formed form a rigid material;
   (b) a substantially hollow sheath defining a passage therein, the connector bar disposed in the passage of the sheath, the sheath having a first end and a second end;
   (c) a first intermediate member comprising;
      (1) a reduced diameter portion dimensioned to fit in the passage at the first end of the sheath, and
      (2) an enlarged diameter portion integral with the reduced diameter portion and dimensioned so as to be too large to fit within the passage of the sheath;
   (d) means for attaching the first intermediate member to a movable first body comprising:
      (1) a support member which is pivotally attached to the first intermediate member and which extends upwardly therefrom, the support member having opposed flattened sides at an upper portion thereof;
      (2) a mounting bracket comprising a substantially flat platform having two sides flanges extending downwardly from opposite sides of the platform, and
      (3) a fastener pivotally attaching the mounting bracket to the support member;
   (e) a second intermediate member comprising:
      (1) a reduced diameter portion dimensioned to fit in the passage of the sheath at the second end thereof, and
      (2) an enlarged diameter portion integral with the reduced diameter portion and dimensioned so as to be too large to fit within the passage of the sheath;
   (f) first pivot means for pivotally attaching the first intermediate member to the first end of the sheath;
   (g) second pivot means for pivotally attaching the first intermediate member to the first end of the connector bar;
   (h) third pivot means for pivotally attaching the second intermediate member to the second end of the sheath;
   (i) fourth pivot means for pivotally attaching the second intermediate member to the second end of the connector bar; and (j) means for attaching the second intermediate member to a second body which is substantially stationary with respect to the first body.

9. An articulated arm for supportably attaching a movable first body to a second body which is substantially stationary with respect to the first body, the arm comprising:
(a) a connector bar having a first end and a second end, the bar being formed from a rigid material;
(b) a substantially hollow sheath defining a passage therein, the connector bar disposed in the passage of the sheath, the sheath having a first end and a second end;
(c) a first intermediate member comprising:
(1) a reduced diameter portion dimensioned to fit in the passage at the first end of the sheath, and
(2) an enlarged diameter portion integral with the reduced diameter portion and dimensioned so as to be too large to fit within the passage of the sheath;
(d) means for attaching the first intermediate member to a movable first body;
(e) a second intermediate member comprising:
(1) a reduced diameter portion dimensioned to fit in the passage of the sheath at the second end thereof, and
(2) an enlarged diameter portion integral with the reduced diameter portion and dimensioned so as to be too large to fit within the passage of the sheath;
(f) first pivot means for pivotally attaching the first intermediate member to the first end of the sheath;
(g) second pivot means for pivotally attaching the first intermediate member to the first end of the connector bar;
(h) third pivot means for pivotally attaching the second intermediate member to the second end of the sheath;
(i) fourth pivot means for pivotally attaching the second intermediate member to the second end of the connector bar and
(j) means for attaching the second intermediate member to a second body which is substantially stationary with respect to the first body, comprising a mounting block which is pivotally attached to the second intermediate member and which has a plurality of mounting holes formed therethrough for passage therethrough of cylindrical threaded mounting hardware.

10. The arm of claim 9, wherein the mounting block further has a plurality of threaded holes formed therethrough, and wherein the means for accommodating attachment further comprises a plurality of tightenable tensioning members having cylindrical threaded portions disposed in the threaded holes for placing tension on said threaded mounting hardware in the mounting holes.

* * * * *